United States Patent
Nagy et al.

(10) Patent No.: US 6,820,083 B1
(45) Date of Patent: Nov. 16, 2004

(54) RELATIONSHIP MANAGEMENT SYSTEM THAT LIMITS ACCESS OF CONTACT INFORMATION TO PARTICULAR FOLDERS

(75) Inventors: Robert M. Nagy, Aurora, IL (US); Karen L. Enright, Glen Ellyn, IL (US); Daniel H. Morgan, Chicago, IL (US)

(73) Assignee: Interface Software, Inc., Oak Brook, IL (US)

( * ) Notice: Subject to any disclaimer, the term of this patent is extended or adjusted under 35 U.S.C. 154(b) by 0 days.

(21) Appl. No.: 09/553,163

(22) Filed: Apr. 19, 2000

Related U.S. Application Data

(63) Continuation-in-part of application No. 09/455,877, filed on Dec. 6, 1999.

(51) Int. Cl.[7] .................................................. G06F 7/00
(52) U.S. Cl. ............................................. 707/9; 707/102
(58) Field of Search ................................ 707/1, 9, 102

(56) References Cited

U.S. PATENT DOCUMENTS

| | | | | |
|---|---|---|---|---|
| 5,295,256 A | * | 3/1994 | Bapat ............................. 707/3 |
| 5,485,567 A | * | 1/1996 | Banning et al. ............ 345/968 |
| 5,737,726 A | * | 4/1998 | Cameron et al. .............. 705/7 |
| 5,813,009 A | * | 9/1998 | Johnson et al. ............. 707/100 |
| 5,905,496 A | * | 5/1999 | Lau et al. .................... 345/835 |
| 6,141,658 A | * | 10/2000 | Mehr et al. ..................... 707/7 |
| 6,253,203 B1 | * | 6/2001 | O'Flaherty et al. ............ 707/10 |
| 6,311,191 B1 | * | 10/2001 | Retallick ..................... 707/10 |
| 6,324,541 B1 | * | 11/2001 | de l'Etraz et al. ............ 705/10 |
| 6,480,850 B1 | * | 11/2002 | Veldhuisen ..................... 707/9 |

OTHER PUBLICATIONS

PCT/US98/22926 WO 99/23591 issued to Robertson.*
INTERFACE, "Interaction™ Enterprise Relationship Management," Administrator's Guide, pp. 1–276, 1998.
INTERFACE, Interaction™ Enterprise Relationship Management, Getting Started Guide, pp. 1–34, 1998.

* cited by examiner

Primary Examiner—Kim Vu
Assistant Examiner—Monplaisir Hamilton
(74) Attorney, Agent, or Firm—Marshall, Gerstein & Borun LLP

(57) ABSTRACT

A relationship management system uses a database to store contact information related to a number of contacts and uses a number of folders, each of which reference one or more of the contacts within the database, to display contact information. Each of the contact information records stored within the database has an associated contact information type and a visibility attribute that defines the folders through which the associated contact information record is viewable. If the visibility attribute is set to a global value, the contact information record may be viewed by all folders. If the visibility attribute is set to a private value, the contact information record may be viewed only by specified folders. When a display routine of the relationship management system displays folders on a display device, a contact information display field is used to display each of the contact information records of a particular type that are defined as being either globally viewable or as being privately viewable through the folder being displayed.

48 Claims, 11 Drawing Sheets

FIG. 3

Contact Details - Tarnoff, Jane

Contact Edit View Go Tools Services Help

View

Jane Tarnoff
Exeutive Director
TeleNorth Finacial Services

Who Knows Who

- Name
- Phone & Address
- Who Knows Who
- Related Contacts
- Company Personnel
- Folders
- Mailers
- Mailing List
- Classifications
- Activities
- Additional Information
- Notes
- Audit Trail Cruse, Ted
  My son plays soccer with Jane's son.
Flynn, David
Johnson, Kathryn
Roberts, Ed
  Jane and I worked together at Fineberg & Assoc.
Solomon, Barry
  Jane and I clerked for Judge Howard together

50

| CONTACT-FOLDER PAIR | OPT-IN FLAG | RELATIONSHIP DESCRIPTION | RELATIONSHIP TYPE | RELATIONSHIP STRENGTH |
|---|---|---|---|---|
| 01257/54341 | X | Jane and I worked together at Fineberg & Assoc. | Business | 7 |
| 01257/54251 | X | My son plays soccer with Jane's son | Social | 3 |
| 01397/54231 | O | I went to high school with Frank | Personal | 2 |
| 01243/54132 | X | Ted is my brother-in-law | Family | 10 |
| 01653/54521 | X | I worked with Jim at McDonnell Douglas | Business | 6 |

| CONTACT-USER PAIR | OPT-IN FLAG | RELATIONSHIP DESCRIPTION | RELATIONSHIP TYPE | RELATIONSHIP STRENGTH |
|---|---|---|---|---|
| 01257/94341 | X | Jane and I worked together at Fineberg & Assoc. | Business | 7 |
| 01257/94251 | X | My son plays soccer with Jane's son | Social | 3 |
| 01397/94231 | O | I went to high school with Frank | Personal | 2 |
| 01243/94132 | X | Ted is my brother-in-law | Family | 10 |
| 01653/94521 | X | I worked with Jim at McDonnell Douglas | Business | 6 |

INT_AUX_DIRECTORY

| | | |
|---|---|---|
| DIRECTORY_ID | INTEGER | NOT NULL |
| DIRECTORY_SRC_ID | INTEGER | NOT NULL |
| DIR_TYP_ID (FK) | INTEGER | NOT NULL |
| DIRECTORY_NM | VARCHAR (80) | NOT NULL |
| DIRECTORY_DESC | VARCHAR (254) | NULL |
| OWNER_ID | INTEGER | NOT NULL |
| CREATE_ID | INTEGER | NOT NULL |
| CREATE_DT | DATETIME | NOT NULL |
| LAST_EDIT_ID | INTEGER | NULL |
| LAST_EDIT_NM | VARCHAR (60) | NOT NULL |
| LAST_EDIT_DT | DATETIME | NOT NULL |
| FIELD_1 | VARCHAR (60) | NULL |
| FIELD_2 | VARCHAR (60) | NULL |
| FIELD_3 | VARCHAR (60) | NULL |
| FIELD_4 | VARCHAR (60) | NULL |
| CHANGE_DT | DATETIME | NOT NULL |
| TRAN_SRC_ID | INTEGER | NOT NULL |
| FLAG_INITIAL_IND | SMALLINT | NOT NULL |
| LARGE_DIR_IND | SMALLINT | NOT NULL |
| LISTING_TYP_IND | SMALLINT | NOT NULL |
| USAGE_IND | SMALLINT | NOT NULL |
| LIST_OWNERSHIP_SCOPE | SMALLINT | NOT NULL |
| SHARE_EXISTENCE_IND | SMALLINT | NOT NULL |
| AUDIT_IND | SMALLINT | NOT NULL |
| SHOW_FLAG_IND | SMALLINT | NOT NULL |
| DEFAULT_PF_ACCESS_IND | SMALLINT | NULL |
| FLAG_DESC | VARCHAR (254) | NULL |
| SYS_ID | INTEGER | NULL |
| SYS_SRC_ID | INTEGER | NULL |
| SYS_IA_EDIT | INTEGER | NULL |
| RESERVED | VARCHAR (254) | NULL |
| timestamp | TIMESTAMP/DATE | NULL |

FIG. 6

INT_AUX_DIR_LIST

| | | |
|---|---|---|
| CONTAIN_DIR_ID | INTEGER | NOT NULL |
| CONTAIN_DIR_SRC_ID | INTEGER | NOT NULL |
| LISTING_ID (FK) | INTEGER | NOT NULL |
| LISTING_SRC_ID (FK) | INTEGER | NOT NULL |
| OWN_DIR_ID (FK) | INTEGER | NOT NULL |
| OWN_DIR_SRC_ID (FK) | INTEGER | NOT NULL |
| CREATE_ID | INTEGER | NOT NULL |
| CREATE_DT | DATETIME | NOT NULL |
| LAST_EDIT_ID | INTEGER | NULL |
| LAST_EDIT_NM | VARCHAR (60) | NOT NULL |
| LAST_EDIT_DT | DATETIME | NOT NULL |
| FLAG_IND | SMALLINT | NOT NULL |
| EXISTENCE_IND | SMALLINT | NULL |
| EXISTENCE_DESC | VARCHAR (254) | NULL |
| CHANGE_DT | DATETIME | NOT NULL |
| TRAN_SRC_ID | INTEGER | NOT NULL |
| RESERVED | VARCHAR (254) | NULL |
| timestamp | TIMESTAMP/DATE | NOT NULL |

FIG. 7

INT_AUX_ADDRESS

| | | |
|---|---|---|
| ADDRESS_ID | INTEGER | NOT NULL |
| ADDRESS_SRC_ID | INTEGER | NOT NULL |
| OWN_LIST_ID (FK) | INTEGER | NOT NULL |
| OWN_LIST_SRC_ID (FK) | INTEGER | NOT NULL |
| ADDR_TYP_ID (FK) | INTEGER | NOT NULL |
| OWN_DIR_ID | INTEGER | NOT NULL |
| OWN_DIR_SRC_ID | INTEGER | NOT NULL |
| CREATE_ID | INTEGER | NOT NULL |
| CREATE_DT | DATETIME | NOT NULL |
| LAST_EDIT_ID | INTEGER | NULL |
| LAST_EDIT_NM | VARCHAR(60) | NOT NULL |
| LAST_EDIT_DT | DATETIME | NOT NULL |
| FORMAT | VARCHAR (254) | NULL |
| LABEL | VARCHAR (40) | NULL |
| LINE1 | VARCHAR (85) | NULL |
| LINE2 | VARCHAR (85) | NULL |
| LINE3 | VARCHAR (85) | NULL |
| CITY | VARCHAR (35) | NULL |
| STATE | VARCHAR (35) | NULL |
| POSTAL_CD | VARCHAR (20) | NULL |
| COUNTRY | VARCHAR (35) | NULL |
| CHANGE_DT | DATETIME | NOT NULL |
| TRAN_SRC_ID | INTEGER | NOT NULL |
| ADDR_SYS_ID | INTEGER | NULL |
| SYS_ID | INTEGER | NULL |
| SYS_SRC_ID | INTEGER | NULL |
| SYS_IA_EDIT | INTEGER | NULL |
| RESERVED | VARCHAR (254) | NULL |
| timestamp | TIMESTAMP/DATE | NULL |

INT_AUX_ELEC_ADDR

130 →

| ELEC_ADDR_ID | INTEGER | NOT NULL |
|---|---|---|
| ELEC_ADDR_SRC_ID | INTEGER | NOT NULL |
| ELEC_ADDR_TYP_ID (FK) | INTEGER | NOT NULL |
| OWN_LIST_ID | INTEGER | NOT NULL |
| OWN_LIST_SRC_ID | INTEGER | NOT NULL |
| OWN_DIR_ID | INTEGER | NOT NULL |
| OWN_DIR_SRC_ID | INTEGER | NOT NULL |
| CREATE_ID | INTEGER | NOT NULL |
| CREATE_DT | DATETIME | NOT NULL |
| LAST_EDIT_ID | INTEGER | NULL |
| LAST_EDIT_NM | VARCHAR (60) | NOT NULL |
| LAST_EDIT_DT | DATETIME | NOT NULL |
| LABEL | VARCHAR (40) | NULL |
| ELEC_ADDR | VARCHAR (254) | NULL |
| MAPI_ADDR_TYP | VARCHAR (254) | NULL |
| CHANGE_DT | DATETIME | NOT NULL |
| TRAN_SRC_ID | INTEGER | NOT NULL |
| ELEC_ADDR_SYS_ID | INTEGER | NULL |
| SYS_ID | INTEGER | NULL |
| SYS_SRC_ID | INTEGER | NULL |
| SYS_IA_EDIT | INTEGER | NULL |
| RESERVED | VARCHAR (254) | NULL |
| timestamp | TIMESTAMP/DATE | NULL |

*FIG. 13*

INT_AUX_PHONE

140 →

| PHONE_ID | INTEGER | NOT NULL |
|---|---|---|
| PHONE_SRC_ID | INTEGER | NOT NULL |
| PHONE_TYPE_ID (FK) | INTEGER | NOT NULL |
| OWN_LIST_ID | INTEGER | NOT NULL |
| OWN_LIST_SRC_ID | INTEGER | NOT NULL |
| ADDRESS_ID | INTEGER | NULL |
| ADDRESS_SRC_ID | INTEGER | NULL |
| OWN_DIR_ID | INTEGER | NOT NULL |
| OWN_DIR_SRC_ID | INTEGER | NOT NULL |
| CREATE_ID | INTEGER | NOT NULL |
| CREATE_DT | DATETIME | NOT NULL |
| LAST_EDIT_ID | INTEGER | NULL |
| LAST_EDIT_NM | VARCHAR(60) | NOT NULL |
| LAST_EDIT_DT | DATETIME | NOT NULL |
| LABEL | VARCHAR (40) | NULL |
| PHONE_NUM | VARCHAR (254) | NOT NULL |
| CHANGE_DT | DATETIME | NOT NULL |
| TRAN_SRC_ID | INTEGER | NOT NULL |
| PHONE_SYS_ID | INTEGER | NULL |
| SYS_ID | INTEGER | NULL |
| SYS_SRC_ID | INTEGER | NULL |
| SYS_IA_EDIT | INTEGER | NULL |
| RESERVED | VARCHAR (254) | NULL |
| timestamp | TIMESTAMP/DATE | NULL |

*FIG. 14*

RELATIONSHIP MANAGEMENT SYSTEM THAT LIMITS ACCESS OF CONTACT INFORMATION TO PARTICULAR FOLDERS

RELATED APPLICATIONS

This is a continuation-in-part of U.S. application Ser. No. 09/455,877, entitled "A Relationship Management System That Provides an Indication of Users Having a Relationship With a Specified Contact," filed Dec. 6, 1999.

FIELD OF THE INVENTION

The present invention relates generally to relationship management systems and, more particularly, to a relationship management system that provides the ability to limit the access of certain contact information to one or more particular folders.

DESCRIPTION OF THE RELATED ART

Relationship management systems typically use one or more relational databases to, for example, store data or information pertaining to contacts, which may be individual persons, corporations, etc. The information stored in the database for any particular contact may include, for example, phone numbers, facsimile numbers, post office addresses, electronic-mail (e-mail) addresses, etc. and this information may be used to produce mailing lists and customer lists, to send facsimiles, e-mails, or to store contact information to be retrieved at any desired time. One of the simplest and most common uses of a relationship management system is as a centralized electronic address book that can be used by any number of individuals or groups within, for example, a corporation, a law firm, etc. for any number of reasons, such as keeping track of contact information, making sales calls, sending letters, facsimiles, e-mails, etc.

At least one known relationship management system stores each of the different types of contact information (such as names, post office, street or e-mail addresses, facsimile and phone numbers, company affiliations, titles, etc.) in a database only once and uses folders to provide access to the stored contact information to any number of the users of the relationship management system. Each contact stored within the database may be referenced by any number of folders and each folder typically has access rights that define one or more users of the relationship management system that can access the folder and, thereby, access the contact information associated with the contacts referenced by the folder. There may be different types of folders, such as private or personal folders in which personal contacts, business contacts, etc. are referenced, business folders, group folders set up for specific groups of users, task folders set up for specific tasks, etc. A user may add, change or delete the contact information for any of the contacts within the folders to which the user has access and may add new contacts and associated contact information to the database by adding a new contact to the folder. Each folder may reference more than one contact and each contact may be referenced by more than one folder. Thus, for example, if two users know the same person (a contact), the personal or private folders for each of these users may reference that contact and, thus, each of these users may have access to the contact information associated with that contact, even though the contact information for that contact is stored only once in the database.

The knowledge of which members of a set of users of a relationship management system know a particular person and how the users know that particular person may be helpful in making presentations to that particular person, performing sales activities in which that particular person is involved, conducting research about the particular person or a corporation at which the particular person works, etc. Thus, it can be helpful for one user of a relationship management system to find out which of the other users of that system (who typically work for or are affiliated with the same company or organization) know a particular person or contact. The knowledge of which users of a relationship management system have a relationship of some kind with a particular person or contact stored in the relationship management system is referred to herein as user-contact reference information.

In the past, relationship management systems, while allowing users to access contact information about contacts stored within the database associated with the relationship management system, did not provide any user with the ability to determine, quickly and accurately, which of the other users of the system knew or had a relationship of some kind with a particular contact. In fact, in the past, information about which users of the system knew which contacts had to be manually entered into the database system as a separate list. Because this list of user-contact reference information changes each time a contact is added to a folder or is deleted from a folder within the database, the user-contact reference list had to be constantly updated, which was tedious, time consuming and prone to data entering errors. Furthermore, the updating of the user-contact reference list was typically given a low priority and, thus, the information within this list was frequently out of date. Likewise, these manually created lists did not provide any information on the type of relationship between the contact and the user (or folder) referencing the contact, such as how these people knew each other or how they met, what specific type of relationship exists, such as a business or personal relationship, or the strength of the relationship.

Still further, it is sometimes helpful to limit certain types of, typically, public contact information, such as addresses, phone numbers, etc. to a specific user or folder. For example, a particular contact may tell one user of the relationship management system a home phone number for that contact, but may ask the user to keep that information private. In at least one prior art relationship management system, placing the home phone number in a phone number table within the database makes that number accessible by other users or folders referencing that contact and, thus, the user given the private number cannot place the private number in the proper address or phone number field of the database. Instead, in at least one known system, the user had to place the private phone number (or address) in a "notes" or "activity" field which was created for each different contact referred to by each user's private folder. These notes fields were stored in a separate table within the database and had a restriction attribute that could be set to make any of the notes fields private to one or more particular folders or globally available to each user or folder. However, this known system did not restrict access to typically public contact information such as addresses and phone numbers stored in address and phone number tables of the database. Still further, this system did not display private phone number or address information (which had to be kept in the notes or activities fields) in the same location on the display screen as phone number or address information available to all of the users, which made it harder to read or use the private phone number and address information in the same manner that the public phone number and address information was read or used.

In another example, certain contact information may be temporary in nature, such as an address, phone number, facsimile number, etc. at which a contact may be reached for the next two months during the conclusion of a deal, a law suit, etc. In this case, it is desirable to only provide this information to users who are working on the deal, law suit, etc., all of which may have access to a particular folder created for that activity. However, again, storing the address and phone number information in the associated contact information tables in one known relationship management system makes the temporary information available to all the users or folders which reference that contact, even users that do not have access to the activity folder for which the information is relevant. This duplicity of information may result in confusion to users of the system who do not know and, generally, do not care, that the contact can be reached, on a temporary basis, at the new address, phone number, etc. In still another case, it may be desirable to restrict certain types of contact information, or all of the contact information for a particular contact to a particular folder to thereby create an information screen which respect to one or more users of the relationship management system.

Still further, some known relationship management systems do not use folders to enable access to contact information. In these systems, certain types of contact information, such as phone number information, can be restricted to individual users. However, these systems do not provide the advantages associated with the use of folders, which makes organization of the contact information more manageable.

Thus, in prior art relationship management systems, there was no way to restrict phone number and address contact information to one folder or user other than using the above-described "notes" or "activity" fields, which displayed the contact information in the context of notes or activities associated with the contact and not in the context of address and phone number information. This, in turn, meant that the same kind of information, such as phone number and address information was being kept in different tables within the database and was being displayed to the user in different contexts. This was undesirable as it could lead to confusion and made the access to private information more difficult.

SUMMARY OF THE INVENTION

A relationship management system uses a database to store a visibility attribute for one or more pieces of contact information stored in contact information tables, such as phone number (e.g., phone, facsimile, etc. number) tables or address (e.g., electronic, post office, etc. address) tables. This visibility attribute may be used to indicate which folder(s) can access the contact information stored in the phone number and address tables. For example, the visibility attribute may indicate that the contact information is globally accessible (i.e., accessible to each folder within the relationship management system) or may specify the identity of one or more specific folders through which the particular contact information is visible. Thereafter, only the folders that are listed in the visibility attribute for a specific piece of phone number or address contact information may access the specific piece of contact information and display this information in the proper address or phone number area of a display screen. In this manner, some phone number and address contact information for a particular contact may be folder specific, i.e., accessible or visible from only one folder, while other phone number and address contact information for the same contact may be accessible or visible from all the folders referencing the contact. Still further, private and public phone numbers and addresses may be displayed in the same areas on a display screen to make the phone number and address information more readable and useable.

BRIEF DESCRIPTION OF THE DRAWINGS

FIG. 3 is an example screen display illustrating a list specifying which users have relationships with a specified contact and some information about the nature of these relationships;

FIG. 4 is a block diagram of a join table stored in a database associated with a relationship management system which stores contact-folder pair information and which may be used to generate the display of FIG. 3;

FIG. 5 is a block diagram of a table stored in a database associated with a relationship management system which stores contact-user pair information and which may be used to generate the display of FIG. 3;

FIG. 6 is a depiction of an example folder table illustrating some exemplary attributes of each folder stored in a database associated with a relationship management system;

FIG. 7 is a depiction of an example join table illustrating some exemplary attributes of each of a set of contact-folder pairs stored in a database associated with a relationship management system;

FIG. 12 is a depiction of an example post office address contact information table illustrating some exemplary attributes for each piece of address information stored in a database associated with a relationship management system;

FIG. 13 is a depiction of an example electronic address contact information table illustrating some exemplary attributes for each piece of electronic address information stored in a database associated with a relationship management system; and FIG. 14 is a depiction of an example phone number contact information table illustrating some exemplary attributes for each piece of phone number information stored in a database associated with a relationship management system.

DESCRIPTION OF THE PREFERRED EMBODIMENTS

Figure 1:
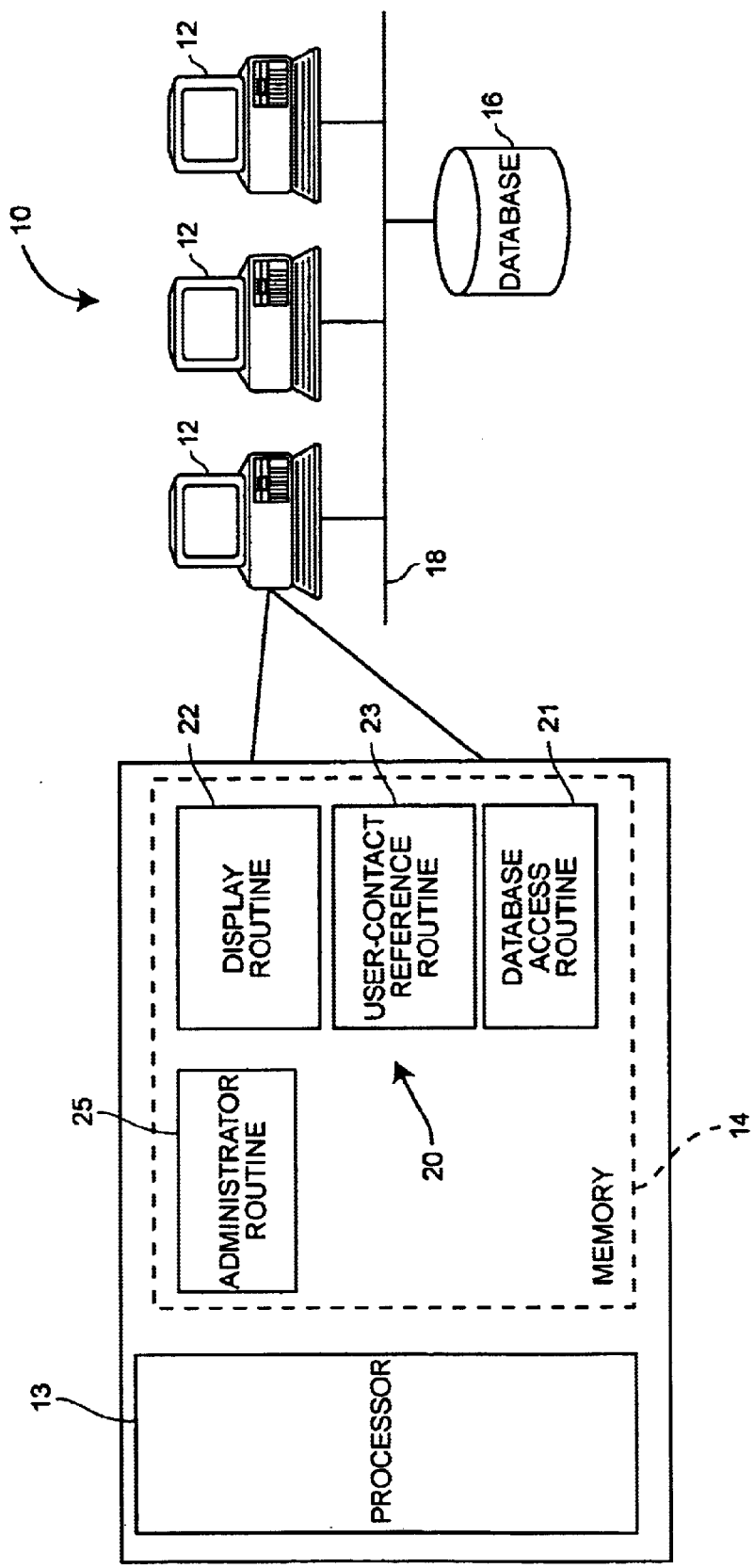
FIG. 1 is a block diagram of an information system network on which a relationship management system may be implemented.

Referring now to FIG. 1, an information system 10 on which a relationship management system can be implemented is illustrated. The information system 10 includes a number of workstations or user interfaces 12, each having an associated processor 13 and memory 14, interconnected to a database 16 via a communication link which may be, for example, a local area network (LAN) link 18. The information system 10 may include any desired number of user interfaces 12 and each of the user interfaces 12 may include any desired type of computer or processor that uses any operating system such as the Microsoft Windows® operating system, a UNIX operating system, etc. to execute programs or applications. Likewise, the database 16 may be any suitable or desired type of database with an associated database server which may be, for example, a Microsoft SQL database server, an Oracle database server, etc. While the database 16 is illustrated as being a stand-alone unit, the database 16 could be integrated into one of the user interfaces 12, if so desired. Still further, the LAN 18 may be any desired type of LAN connection such as a Microsoft NT or a Novel Netware, or may be any other desired type of communication network. While the LAN 18 preferably uses a TCP/IP protocol, any other communication protocol may be used as well to provide communications between the user interfaces 12 and the database 16.

As illustrated for one of the user interfaces 12 in FIG. 1, each of the interfaces 12 includes a relationship management routine 20 that executes on the processor 13 of the user interface 12. The routine 20 includes a database access routine 21 that communicates with the database 16 and accesses data within the database 16 using any desired type of communication layer. The database access routine 21, if desired, may use a database driver, such as the Microsoft DB-LIB driver, to perform communications with the database 16. The routine 20 also includes a display routine 22 which, as is typical in relationship management systems, creates user interface screens for display on a display screen or other display device associated with the user interface 12 to enable communication with the user via the user interface 12. The routines 21 and 22 operate together to enable a user to enter information, such as contact information related to persons or corporations or other entities to be stored in the database 16, to delete information from the database 16, to access information stored in the database 16, etc. The user may also use the routines 21 and 22 to perform functions using contact information stored in the database 16, such as to send e-mails, facsimiles or regular mail, to create mailing lists, customer lists, etc. Of course, the relationship management system may have many other uses. As illustrated in FIG. 1, the system 20 also includes a user-contact reference routine 23 which, as described hereinafter, accesses the database 16 to determine which users of the relationship management system 20 know (i.e., have a relationship of some kind) with a contact specified by a user.

Generally speaking, the database 16 stores information about any number of contacts, which may be persons, corporations or other entities. The database 16 may store different types of contact information, such as name and title information, post office, street and electronic address information, phone number and facsimile number information, etc. for each contact in different contact information tables. Still further, the database 16 stores indications of folders and each folder includes a reference to zero, one or more of the contacts within the database 16. Each folder has access rights enabling one or more particular users of the relationship management system 20 to use the folder. The user having access rights to a folder can view or otherwise access information pertaining to the contacts referenced by that folder. Thus, the user having access to a folder can place a contact within the folder (i.e., can reference a contact using the folder) and can store and retrieve contact information from the contact information tables within the database 16 pertaining to the contact referenced by the folder. A folder can be a private or personal folder, in which case the folder is "owned" by an individual and can be used to store, for example, personal, business and other contact information for that individual. Alternatively, a folder can be a group folder used by a group of users, for example, to reference contacts making up a mailing list, a customer list, etc., to reference contacts associated with a particular project, such a business deal that is in progress, to reference contacts having some common characteristic, such as lawyers, doctors, etc. or can be a folder created for any other purpose or activity. Of course, folders may be used in any other manner to reference contacts of any desired nature and folders may be accessible by one or more users. As used herein, the term folder refers to any programming construct that enables certain contact information to be visible to one or more particular users of a relationship management system.

Generally speaking, the system 20 enables a user to log into the relationship management system and then enables the user to view the folders to which the user has access. The view of the folder may include an indication of each of the contacts stored in the database referenced by the folder. The system 20 and, in particular, the database access routine 21 may enable the user to view particular contact information stored in the database 16 associated with any of the contacts referenced by the folder to, for example, add new contacts to the folder, to add new contact information pertaining to any of the contacts within the folder, to delete or change contact information pertaining to any of the contacts within the folder, etc. Likewise, the user may use the contact information pertaining to the contacts referenced by any of the folders to which the user has access in other applications executed on one of the user interfaces 12, such as e-mail, facsimile and Internet access programs, applications which use this information such as applications which create or use mailing lists, customer lists, etc. Of course, different users may enter different contact, folder and user information into the database 16 using different user interfaces 12, each of which will have access to a copy of the system 20 for use in accessing the database 16 and displaying information to a user.

To create the relationship management tables within the database 16, one of the user interfaces 12 stores and executes a system administrator application or program 25 which installs or sets up the tables and fields within the database 16 for the folders, contacts and contact information, as well as any other desired tables and fields used in any manner by the relationship management system 20. Once the database 16 is set up or created, each of the systems 20 can access the appropriate tables and fields in the database 16 as described above to add, delete, view and use the folders, contacts and contact information stored in the database 16. In one embodiment, a list of contacts is stored in one table in the database 16 along with a unique identifier or contact ID for each contact, while the list of folders and a unique folder ID for each folder is stored in a separate table. Still further, a table may store unique user IDs for each user of the relationship management system. Different types of contact information is stored in still different tables and, generally speaking, a different table exists for each different type or category of contact information, such as addresses, phone numbers, etc. Of course, each contact information table may have different attributes for each piece or type of contact information. Thus, a table that stores street or post office address information may have different fields or attributes including, for example, a number of fields for a street or post office designation, a field for a city designation, a field for a state designation, a field for a zip code designation, etc., while a table that stores electronic address information may have a field for an e-mail address and a field for a web site address.

Also, generally speaking, when a user wants to add a new contact to the database 16, the database access routine 21 may search the contact table within the database 16 to determine if a contact having that name or a similar name already exists within the database 16. A set of similar contacts may be displayed to the user and the user may be asked if any of the already existing contacts is the same contact as the new contact being entered. If not, then the new contact is stored in the contact table and is given a unique contact ID and, thereafter, contact information may be stored for this new contact in the contact information tables by referencing the contact ID associated with this new contact. However, if the contact already exists within the database 16, then the user can simply add the contact to the user's folder and begin to access the contact information already stored for this contact. Of course, the user can also add new contact information or change contact information for that contact. In this manner, only one contact ID is created for each contact, even if numerous folders reference that contact because, for example, numerous users have a relationship of some sort with that contact.

In the past, however, relationship management systems have not enabled users of the relationship management system to automatically determine which other users of the system have some kind of relationship with a particular or specified contact or the nature of such a relationship. That is, these systems did not provide any sort of automatic user-contact reference functionality. The knowledge of which other users have a relationship with a specified person can be especially helpful for a first user in making sales calls to the specified person or in otherwise dealing with the specified person because the first user needing the user-contact reference information can talk to the other users who already have relationships with the specified person and find out what type of person the specified person is, what the specified person likes or dislikes, etc. According to the invention, the user-contact reference routine 23, when executed, searches the database 16 to determine which users of the relationship management system know or otherwise have a relationship with a specified contact. The display routine 22 then displays to the user implementing the user-contact reference routine 23, using any desired display mechanism, such as a display screen, printer, etc., the other users of the system that have some kind of relationship with the particular or specified contact and may display some information pertaining to or describing the nature of the relationship.

Figure 2:
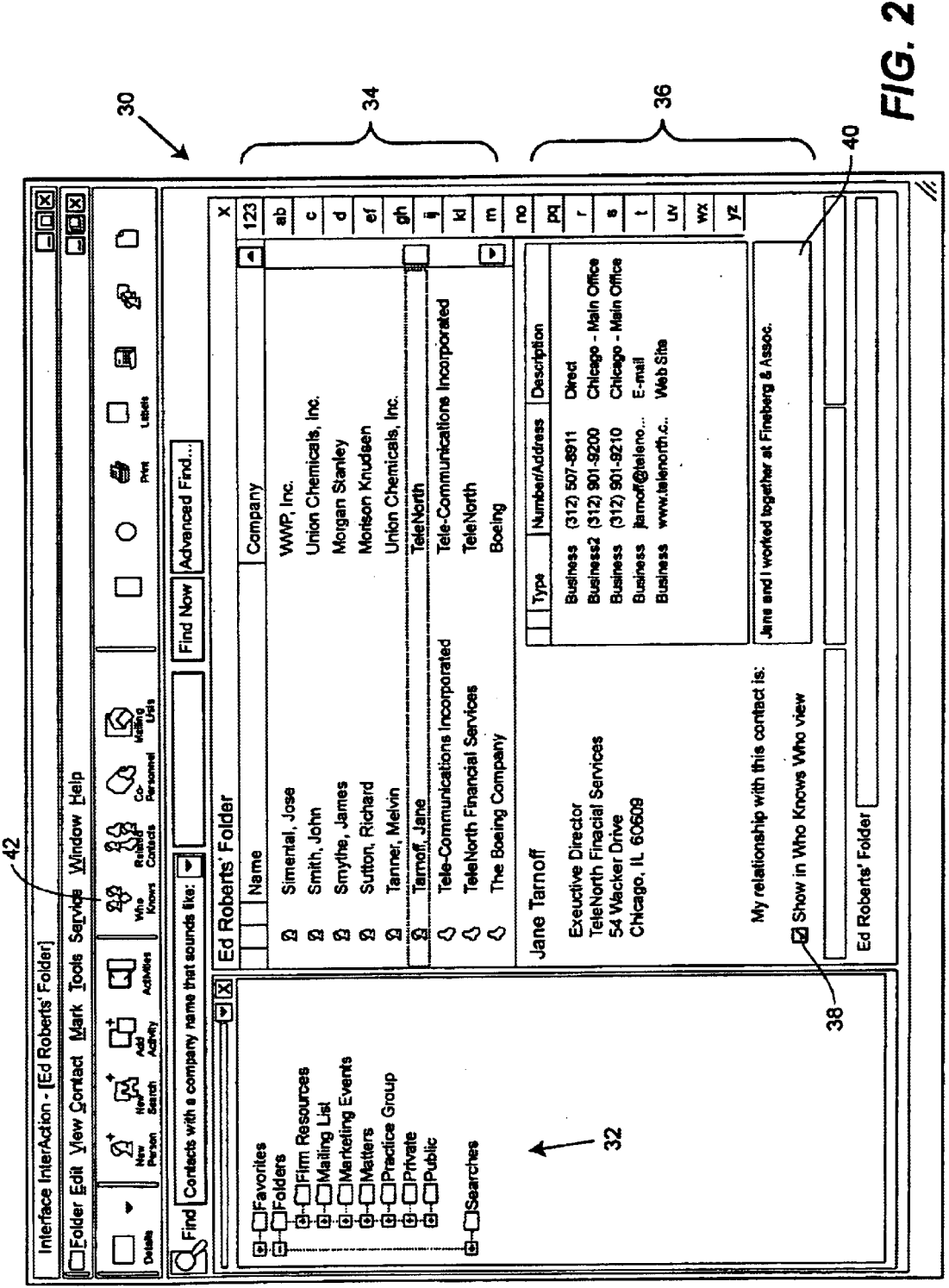
FIG. 2 is an example screen display used in a relationship management system to enable a user to reference contact information for one or more contacts stored in a database and to use a user-contact reference routine to determine which users of the relationship management system have a relationship with a specified contact.

Referring now to FIG. 2, a screen display 30 which may be created by the routine 22 to display the contents of a folder, in this case, Ed Roberts' private folder, is illustrated. The screen display 30 includes a browser section 32 illustrating the folders to which the user (in this case, presumably Ed Roberts or someone else having access to Ed Roberts' private folder) has access. These folders are illustrated as firm resources folders, mailing list folders, marketing event folders, matter folders, practice group folders, private folders, and public folders. Of course, these folder names and types are used as examples only and other types or kinds of folders could also exist within the database 16. In any event, the Ed Roberts' private folder is illustrated in a folder view 34 which includes a list of contacts referenced by Ed Roberts' private folder. As illustrated in FIG. 2, a number of personal contacts including Jose Simental, John Smith, etc. as well as a number of corporate contacts, including Tele-Communications Incorporated, TeleNorth Financial Services, etc. are listed or are referenced by Ed Roberts' private folder. Of course, contacts, such a personal contacts, may have associated companies which may be other contacts stored within the database 16. Thus, John Smith is associated with Union Chemicals, Inc., as illustrated in the folder view 34.

Still further, particular contact information may be displayed about a selected one of the contacts (illustrated as Jane Tarnoff in the display screen 30). As illustrated in a contact information view 36, the business association, address, two business phone numbers, a facsimile number, an e-mail address, and a web site address for Jane Tarnoff are illustrated as the contact information stored for the contact Jane Tarnoff within the database 16. Of course, as indicated above, the different types of contact information for Jane Tarnoff (or any other contact) are stored in different tables within the database 16 and this information, as stored in the contact information tables, reference the contact ID for Jane Tarnoff (or some other contact ID). The different information related to each type of contact information may be stored in different fields of the contact information tables. Thus, for example, the table for post office address information may include fields for title information, street location, city, state and zip code information. The table for phone numbers may include a type (such as business, home, alternate business, etc.) field, a nature field, such as a whether the number is a phone number or a facsimile number (illustrated as icons in the contact information view 36), a number field, and a description field. This information is displayed in different portions of the contact information view 36 of FIG. 2.

Still further, as illustrated in FIG. 2, the contact information view 36 includes an opt-in box 38 which is used by the user-contact reference routine 23. The opt-in box 38 may be selected by checking (or not checking) the box 38 which sets or does not set an opt-in flag in a field within the database 16, to be described hereinafter. Similarly, the contact information view 36 includes a relationship description section 40 in which the user (in this case any user having access to Ed Roberts' private folder) can place a description of the relationship between the user (to which the folder belongs) and the contact. The text entered into the description section 40 is also stored in a field in the database 16 as described hereinafter. Of course, other types of relationship description information may also be entered by the user. For example, a simple description of the nature or type of relationship may be chosen from a predetermined set of descriptions, such as whether the relationship is a business, personal, social, family, etc. relationship. Alternatively or in addition, an indication of the strength of the relationship, such as a number ranging from one to ten with ten being a very strong relationship and one being a very weak relationship (as in, the user barely knows the contact) may be entered by the user.

It will be understood that the other folders which reference the Jane Tarnoff contact, especially other private folders, will have similar opt-in and description fields to be used to describe the relationship which these other users have with Jane Tarnoff. Likewise, any of the other contacts referenced by Ed Roberts' folder may provide similar opt-in and description fields to enable the relationships between Ed Roberts and these other contacts to be discovered and described by the user-contact reference routine 23.

In any event, when a user, such as the user viewing the Ed Roberts' folder wants to find out which other users know or have some relationship with a contact, in this case, Jane Tarnoff, the user can select the Who-Knows-Who™ feature 42 which causes the system 20 to implement the user-contact reference routine 23 which searches the database 16 for all of the users or folders, or some subset of the users or folders, such as all private folders, which reference the Jane Tarnoff contact and which have set the opt-in flag to illustrate this relationship. Upon running such a search, the user-contact reference routine 23 may then use the display routine 22 to display a screen such as that illustrated in FIG. 3 which shows the results of the search for the users who know the Jane Tarnoff contact. As illustrated in FIG. 3, five users (Ted Cruse, David Flynn, Kathryn Johnson, Ed Roberts and Barry Solomon) know or have referenced the Jane Tarnoff contact in their private folder and have set the opt-in flag to enable this relationship to be illustrated by the user-contact reference routine 23. Only three of these users have placed a description in the description field 40 for Jane Tarnoff. With the list of FIG. 3, the user who executed the user-contact reference routine 23 can next talk to any of the other users (Ted Cruse, David Flynn, etc.) about Jane Tarnoff to get more specific information about Jane Tarnoff, such as her likes and dislikes, etc. Likewise, the user who executed the user-contact reference routine 23 can determine which of the other users to talk to first based on the description or nature of the relationship displayed in the list of FIG. 3.

Methods for enabling the user-contact reference routine 23 to determine which of the users of the relationship management system know which contacts will now be described in more detail with respect to FIGS. 4–7. Generally speaking, a set of contact-user pairs are stored within the database 16 and each of these contact user pairs evidences the existence of a relationship of some kind between the contact indicated by the contact portion of the contact-user pair and the user indicated by the user portion of the contact-user pair. The contact portion may directly or indirectly indicate a particular contact and may be, for example, a contact ID. Likewise, the user portion of the contact-user pair may directly or indirectly indicate one or more particular users. The user portion may be, for example, a user ID or a folder ID. If the user portion is a folder ID, then the user associated with the contact-user pair may be one or more of the users having access rights to the folder specified by the folder ID. However, the contact-user pair may include any other type of information which indicates, either directly or indirectly, a relationship between a contact and a user.

Referring to FIG. 4, the database 16 may include (store) a join table 50 which may have a number of fields. The first field 52 (illustrated as the first column of the table 50) is a contact-folder pair field in which a contact ID and a folder ID pair for every contact in every folder that is to be used in performing the determination of which users know a specified contact is listed. While the contact and folder IDs are illustrated in FIG. 4 as being in a single column or field, they would typically be stored in separate columns or fields within the database 16. In any event, there will be a separate contact-folder pair for each of the contacts illustrated in the Ed Roberts' folder of FIG. 2 where the contact ID changes but the folder ID remains the same (because all of these contacts are in the same folder). Of course, the same contact within different folders will produce contact-folder pairs having the same contact ID but having different folder IDs. For each contact-folder pair, an opt-in flag field 54 (the second column of the table 50) exists. If the opt-in flag is not set (O), then the user-contact reference routine 23 will not use the contact-folder pair in identifying which users know a specified contact and will not display this relationship in the results of the search performed by the user-contact reference routine 23. As indicated with respect to FIG. 2, the opt-in flag is set (X) by selecting or not selecting the box 38. Furthermore, each entry in the join table 50 includes a relationship description field 56 in which the user entered description of the relationship is stored. The description field 56 corresponds to the section 40 of FIG. 2. Likewise, other fields may exist, such as a predetermined description field 58 (storing a simple descriptor of the type of the relationship) and a relationship strength field 60 indicating the strength of the relationship, as described above. The join table 50, which may be created and used to specify which folders reference which contacts, is stored in the database 16 and is updated each time a contact is added to folder or deleted from a folder. Of course, the information stored in the fields 54, 56, 58 and 60 may be changed by users at any time.

When executing, the user-contact reference routine 23 may access the join table 50 and search for the contact ID in each of the contact-folder pairs within the contact-folder pair field(s) 52. Upon finding the contact ID, the routine 23 determines the ID of the folder in the pair and uses this folder ID to identify the user(s) who has (have) a relationship with the contact. In particular, the users having access to the identified folder, or the primary user of the identified folder may be determined as the user having the relationship with the contact. If desired, the folder name may be used as the user having the relationship with the contact. In some cases, the user contact reference routine 23 may only search for contacts in certain classes or types of folders, such as privately owned folders, to assure that there is a one-to-one user-to-contact relationship. However, this need not be the case and more than one user may be identified as the user having the relationship with the contact for each contact-folder pair. If the user-contact reference routine 23 is only used, for example, with private folders, the routine 23 determines the type of the folder (which is typically stored as an attribute of the folder in a folder table) and discards or dismisses contact-folder pairs in which the type of the folder is not a private folder.

In any event, whenever the user-contact reference routine 23 identifies a contact folder pair for the particular contact and the folder is of the appropriate type, the routine 23 checks the status of the opt-in flag in the field 54 for that contact-folder pair. If the opt-in flag is set, then the relationship is illustrated to the user in a list or results screen, such as that of FIG. 3, which may identify the user(s) associated with the folder in the identified contact-folder pair. The information in the fields 56, 58 and 60 may also be displayed to the user in the results screen. Of course, it will be understood that the opt-in flag can be set or not set to cause the relationship to be illustrated in the results screen and the opt-in flag could just as well be an opt-out flag, both of which are considered to be the same thing herein and will be described as an opt-in flag.

In another embodiment, a separate table called a contact-user table could be created within the database 16 and used to enable the user-contact reference routine 23 to operate. Referring now to FIG. 5, a contact-user table 70 includes a first column or field 72 which holds, for example, a contact ID and a user ID pair and columns or fields 74, 76, 78 and 80 which are the same as the fields 54, 56, 58 and 60 of FIG. 4, namely, the opt-in flag field 74, the user defined description field 76, the preset relationship type field 78 and the relationship strength field 80. Again, while the contact and user IDs are illustrated in FIG. 5 as being in a single column or field, they would typically be stored in separate columns or fields within the database 16. In this case, each time a user performs some activity which references a contact, such as putting a contact within a folder to which the user has access, or performing some other function, such as requesting information about the contact, performing a search on the contact etc., the database access routine 21 may ask the user whether or not the user wants the relationship with the contact to be used in the future in the user-contact reference function. If the user says yes, the user ID and contact ID may then be stored as a pair in the contact-user pair field 72, the opt-in flag can be set (or not set) and the associated relationship information such as the relationship description, the relationship type, and the relationship strength information may be provided by the user and stored in the contact-user table 70. This relationship information may, for example, be provided by the user using the screen 30 of FIG. 2 when the user adds a contact to a private folder or may be queried from the user when the user performs some other function to indicate that the user knows or has a relationship with a contact. A user-contact pair may also be deleted when a user removes a contact from a folder. If desired, however, the user may be prompted to see if the user wants to delete the contact-user pair from the table 70 when a user removes a contact from a folder (or at other times) to thereby enable a contact-user pair to exist and be discovered by the user-contact reference routine 23 even though the user may not have access rights a folder referring to that contact. The contact-user table 70 of FIG. 5 enables the relationship management system to capture user-contact relationships even when a user does not place a contact within a folder to which the user has access or after a user has deleted a contact from that user's folder.

FIG. 6 illustrates a folder table 90 which may be created and stored in the database 16 to, among other things, enhance the operation of the user-contact reference routine 23 described herein. The folder table 90 is a table within a standard data model and is illustrated as defining the type of attributes in the left-hand column, the type of data stored by the attributes in the middle column and whether the attributes are required fields (NOT NULL) or non-required fields (NULL) in the right-hand column. As illustrated in FIG. 6, the folder table 90 includes unique IDs or keys of DIRECTORY_ID and DIRECTORY_SCR_ID (above the line in the table) which may be used to provide a unique number or ID for each folder used by the relationship management system. Each folder also includes a number of attributes including a type attribute (DIR_TYP_ID) which may be a private type, a group type, etc., a name attribute (DIRECTORY_NM), a description attribute (DIRECTORY_DESC), and an owner attribute (OWNER_ID) which identifies the owner or user who has primary access to the folder. Each folder may also include auditing attributes, such as attributes which indicate the user who created the folder (CREATE_ID), the date of creation (CREATE_DT), the last user to edit the folder (LAST_EDIT_ID), the name of the user who performed the last edit (LAST_EDIT_NM) and the last edit date (LAST_EDIT_DT). Of course, other attributes may be provided for other functions performed using the folder. One attribute however, illustrated in FIG. 6 as the SHARE_EXISTENCE_IND attribute, may be used to set a default value for the opt-in flag 54 of FIG. 4 or 74 of FIG. 5. Thus, the default value of the SHARE_EXISTENCE_IND attribute may be set on a folder basis and this value determines the default setting to which the opt-in flag 54 or 74 will be set within the join table 50 or the contact-user table 70 for each contact-user pair created within the join table 50 or the contact-user table 70 for a particular folder. Of course, the value specified by the SHARE_EXISTENCE_IND attribute may be changed using, for example, the box 38 in the screen display of FIG. 2.

Referring now to FIG. 7, an example join table 92 and the attributes thereof are illustrated. In particular, the join table 92 includes unique keys defining the contact (LISTING_ID and LISTING_SRC_ID) and the folder (CONTAIN_DLR_ID and CONTAIN_DIR_SRC_ID) pair. Each contact-folder pair includes additional attributes such as auditing attributes (the CREATE and LAST attributes as defined above) and other attributes not specifically needed to determine which users have a relationship with a particular contact. Likewise, each contact-folder pair includes an EXISTENCE_IND attribute which stores the value of the opt-in flag for this contact-folder pair and an EXISTENCE_DESC attribute which stores the string defining the relationship description entered into the section 40 of the screen display 30 of FIG. 2 for this contact-folder pair (which is a contact-user pair). Of course, each entry in the join table 92 could have other attributes used to store other types of relationship description information, or used for other purposes by the relationship management system, if so desired.

Of course other methods of storing and determining relationships between users and contacts using tables in the database 16 may be used as well to enable the user-contact routine 23 to determine which users have a relationship of some kind with any particular contact. The user-contact routine 23, as described herein, enables the relationships between users of the relationship management system and any particular contact stored in the database associated with the system to be determined quickly and accurately because this information is automatically stored, created or deleted when a user references a contact or deletes a contact from a folder or otherwise indicates a relationship with a contact. Furthermore, because the relationship information is stored in and determined from tables, such as those used to perform other functions within the relationship management system, no one has to manually enter or update a user-contact reference list, which makes the relationship information determined by the user-contact reference routine 23 described herein more accurate and reliable. Still further, the opt-in flag enables a user to hide the fact that the user has a relationship with a particular contact, assuring privacy where needed or desired. Likewise, the relationship description, type and strength or other relationship description fields provide a user with more information about the relationships between users and any specified contact than that provided by a manually created list of user-contact relationships typically created by known systems.

As indicated previously, in one prior art relationship management system, contact information stored in address and phone number contact information tables, such as post office address tables, phone number tables, facsimile number tables, electronic address tables, etc., was available to any folder that referenced the contact with which the contact information was related. Thus, it was impossible for this system to store information in these contact information tables in a manner that made a particular piece of contact information visible only to a limited number of folders. In fact, in this system, a user had to store all the private information in a "notes" or "activities" section of the folder and, while a "notes" or "activity" section could be created for each contact referenced by each folder and could be designated to be available globally or to only a limited number of folders, the information in these "notes" or "activity" sections was not displayed in a field that clearly indicated that the private information related to phone numbers or addresses for the contact, which made this private information more difficult to read, to find and to understand. In fact, placing typically publically available contact information in a "notes" section of a folder made the location and use of this information more difficult because, for example, the phone number, address, etc. information was not located or displayed in a phone number or address section of a display screen where the user expected to view this information.

To overcome this problem, a visibility attribute is provided for one or more pieces of contact information in each of the contact address and phone number information tables stored in the database 16 and this visibility attribute defines the particular folder(s) through which the associated piece of address and phone number contact information is visible. In this manner, any particular piece of contact information for a contact, such as a phone number, address, etc. may be marked and held private and may be accessible only to a particular individual or through a limited number of folders, while other pieces of contact information for the same contact may be visible or available through each folder referencing the contact. The ability to make individual pieces of contact address and phone number information stored in different contact information tables private, enables users to keep certain types of information pertaining to a contact private to a folder while still being able to view that private information in the proper context on a display screen. As indicated above, the ability to limit the access of certain contact information to individual folders is also useful for, among other things, keeping information private to a single user, storing temporary contact information, storing contact information which is relevant to only a subset of the users of the relationship management system and creating information "screens" within an organization.

Figure 8:
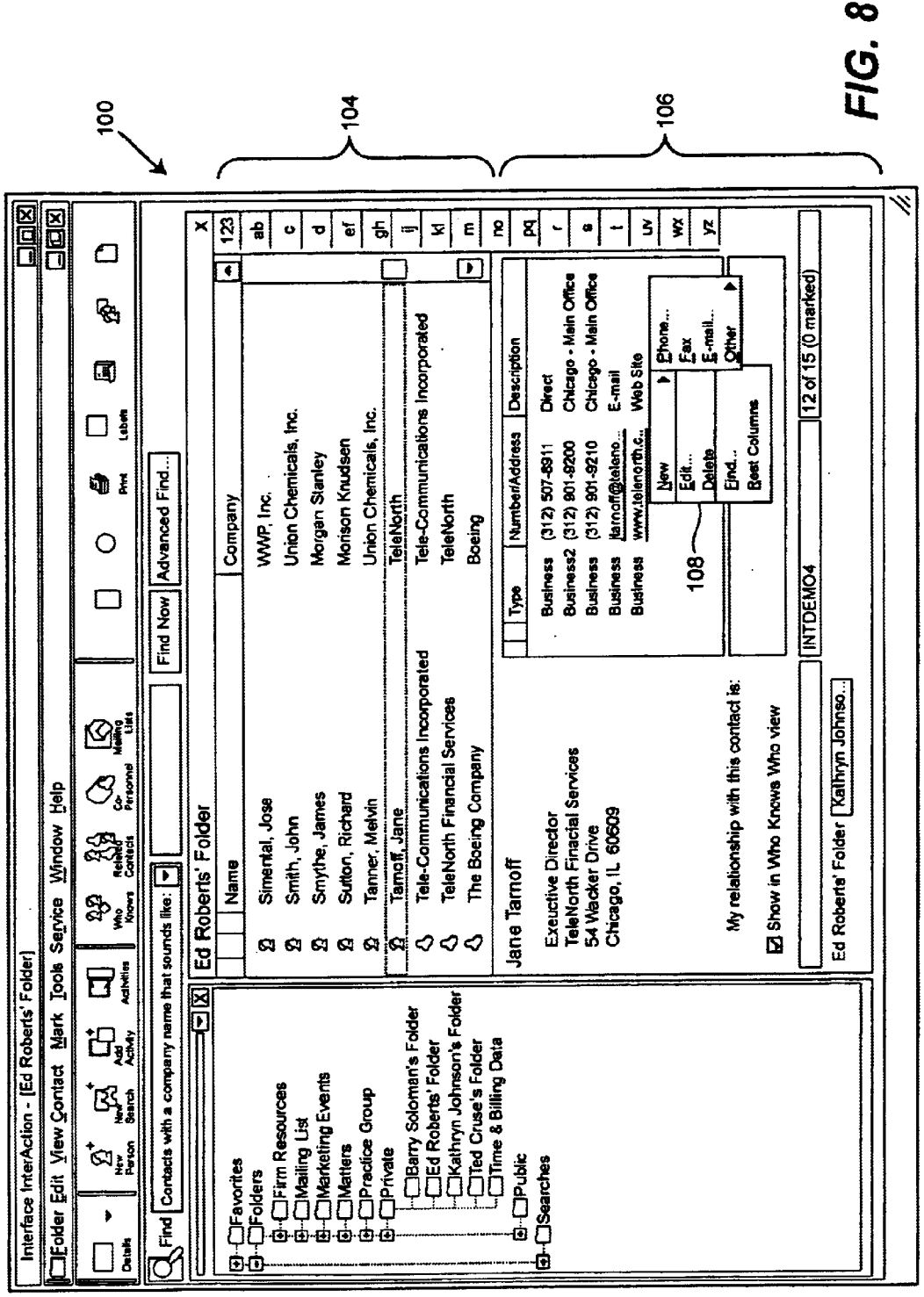
FIG. 8 is an example screen display used in a relationship management system to enable a user to reference contact information for one or more contacts stored in a database and to make some contact information private to one or more folders.

Referring now to FIG. 8, a screen display 100 illustrating a view of Kathryn Johnson's private folder is shown. Similar to the screen display of FIG. 2 for Ed Roberts' private folder, the screen display 100 includes a folder view 104 illustrating the contacts referenced by Kathryn Johnson's private folder and a contact information view 106 illustrating the contact information about a selected one of the contacts (here, Jane Tarnoff) visible from Kathryn Johnson's private folder. The contact information in the view 106 is the same as the contact information displayed within the view 36 for Ed Roberts' private folder except that the direct business number for Jane Tarnoff, which is in Ed Roberts' view 36 is not visible in Kathryn Johnson's view because Ed Roberts marked this piece of information private or visible only from Ed Roberts' private folder.

Figure 9:
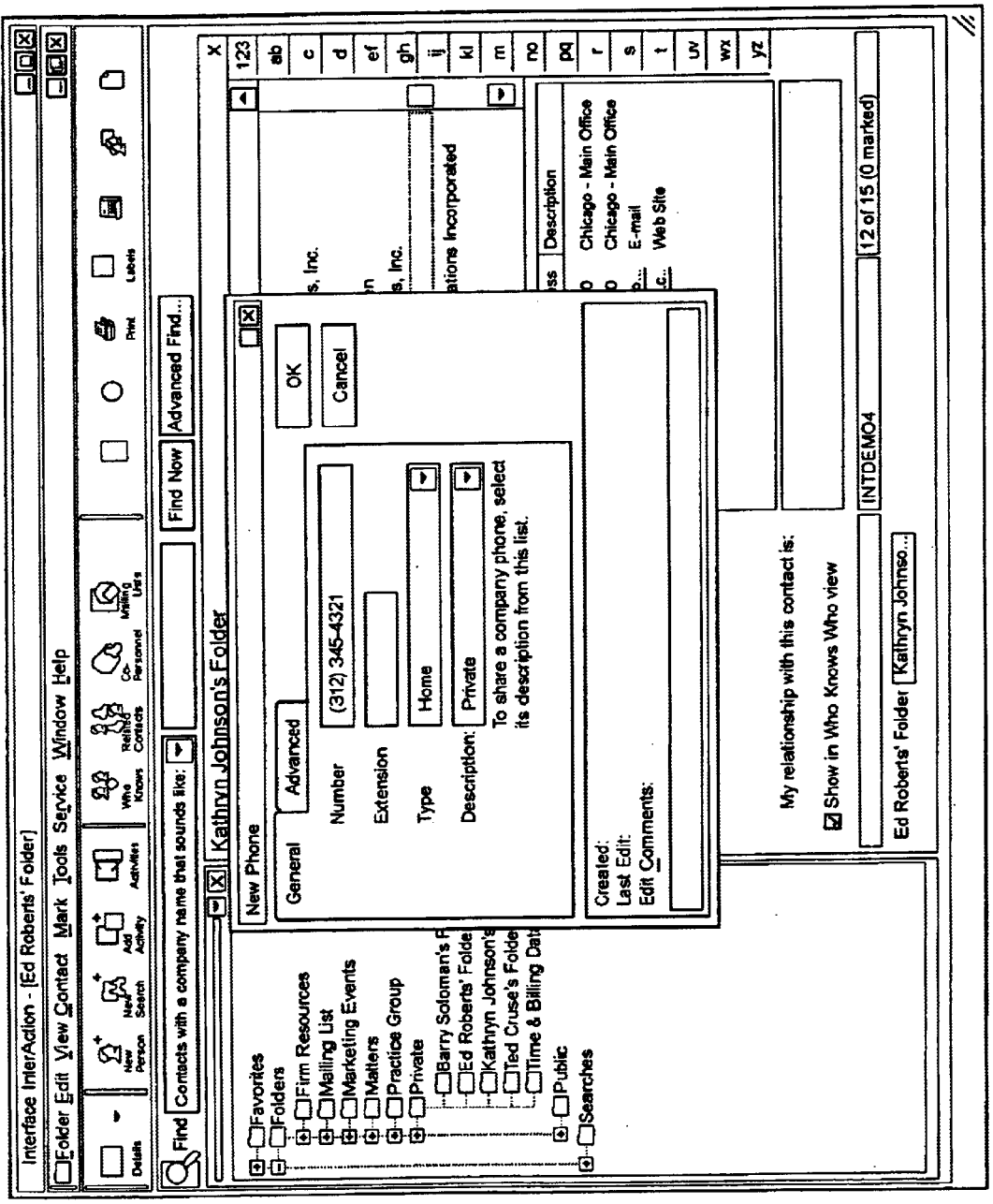
FIG. 9 is an example screen display used in a relationship management system illustrating a contact information selection menu.
Figure 10:
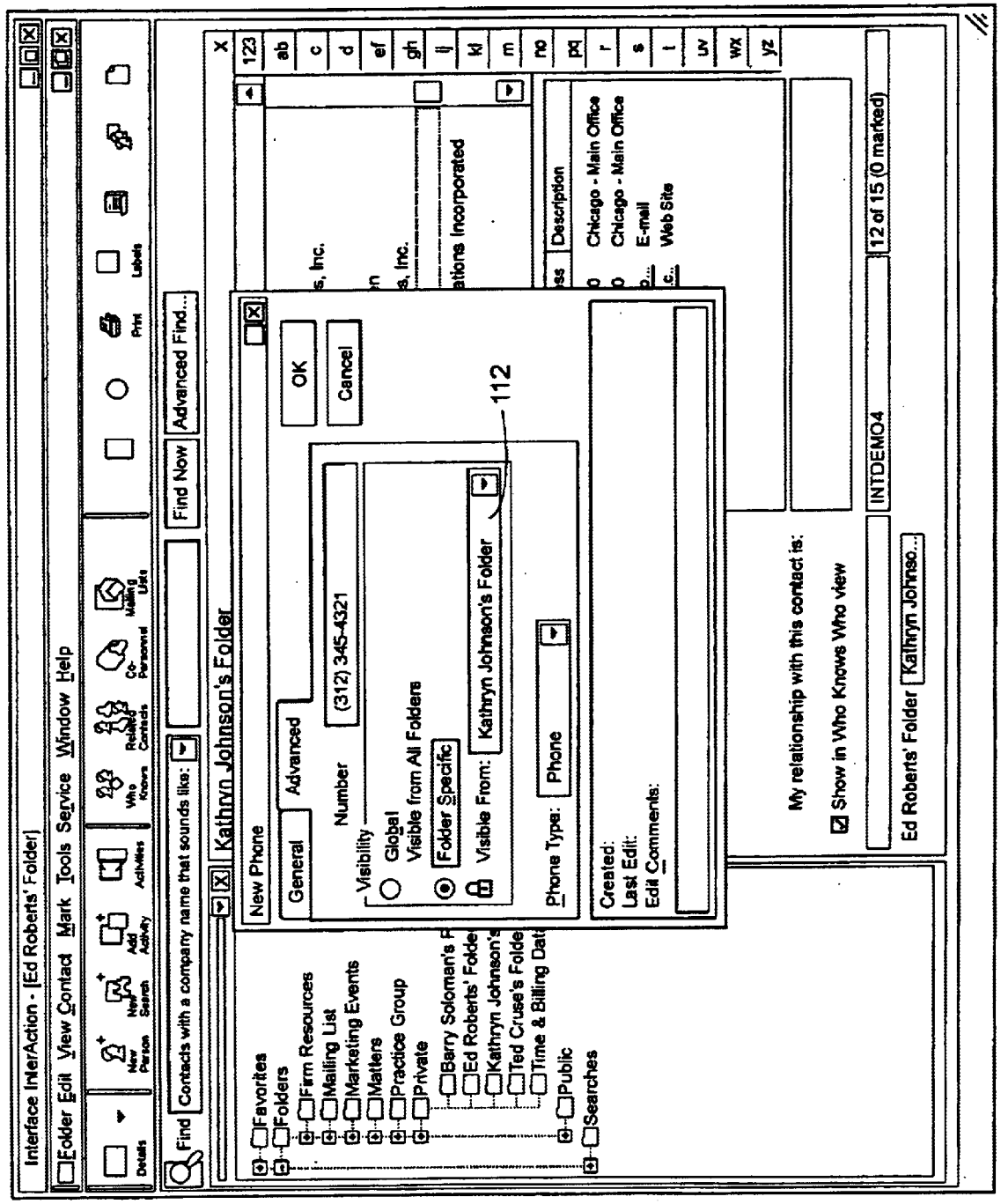
FIG. 10 is an example screen display used in a relationship management system illustrating a contact information entry menu for use in setting a visibility attribute for a piece of contact information.

To store private information, the user viewing Kathryn Johnson's folder can, for example, right click using a mouse to get a context menu 108 illustrated in FIG. 8. Next, the user can select any type of contact information for entry from the menu 108. As illustrated in FIG. 8, a new phone number for Jane Tarnoff is selected for entry. In response, a general phone number entry menu such as that of FIG. 9 may be displayed and the user viewing Kathryn Johnson's private folder may enter the new phone number, an extension, a type and a description, all of which are stored in different fields or as different attributes of a phone number table within the database 16. Next, selecting an advanced menu, as illustrated in FIG. 10, the user may set attributes (which are stored in a phone number table in the database 16) to set the visibility of this new information. In the example illustrated in FIG. 10, the user may select the visibility of the new contact information to be global, in which case the new information would be visible from any folder referencing the Jane Tarnoff contact, or folder specific, which is the selection chosen in FIG. 10. When the visibility attribute is set as being folder specific, an indication of the one or more folders to which this piece of contact information is visible can be entered in the "Visible from" section 112. As will be understood, setting the visibility attributes in the menu of FIG. 10 sets attribute values in a contact information table for the new piece of contact information. Of course, new contact information and visibility attributes for that information may be entered in any other desired manner and it will be understood that the database access routine 21 and the display routine 22 operate to prompt the user for the information and to store that information within the proper tables of the database 16.

Figure 11:
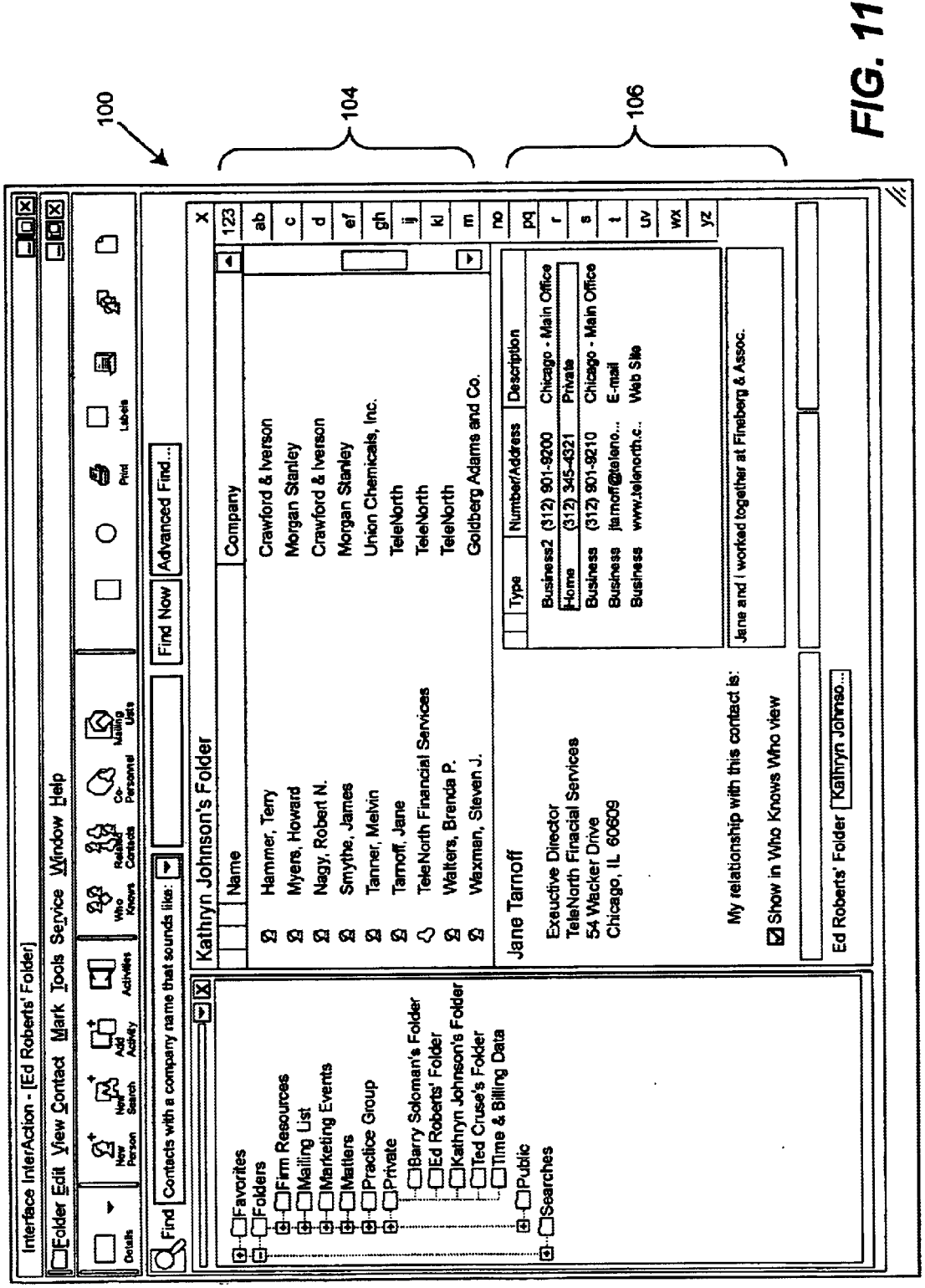
FIG. 11 is an example screen display used in a relationship management system to enable a user to reference contact information for one or more contacts stored in a database and illustrating a piece of contact information which is visible only to a particular folder.

Referring now to FIG. 11, the contact information view 106 of Kathryn Johnson's private folder, after entry of the new home phone number for Jane Tarnoff, is illustrated. As can be seen, the new home phone number is visible from Kathryn Johnson's private folder because the visibility attribute for this number specified Kathryn Johnson's private folder as being a folder through which this number is to be visible. The fact that this phone number is private is indicated by a lock icon next to this phone number. Note, a similar lock icon is displayed next to the direct business phone number for Jane Tarnoff visible in Ed Roberts' private folder (FIG. 2) but not visible in Kathryn Johnson's private folder. However, the new home phone number entered using Kathryn Johnson's private folder is still not visible from Ed Roberts' private folder (as illustrated in FIG. 2) because this new number is not globally visible and the visibility attribute for this phone number did not specify Ed Roberts' private folder as a folder from which this information is to be visible. The display routine 22 may display the lock icon (or some other indication that this piece of contact information is private) next to a phone number or address that is not globally visible and may display some other icon such as a building icon next to globally visible contact information.

Of course, it will be understood that any piece of contact information, such as any address, title, phone number, facsimile number, electronic address, etc. can be marked as being globally visible or as being visible from only one or more specific folders (or users). Likewise, it will be understood that a separate visibility attribute will exist for each piece of contact information stored in any contact information table within the database 16 if it is desired to make this contact information capable of being held private. Still further, it will be understood that the routines 21 and 22, when displaying contact information within a contact information view associated with a folder, searches the contact information tables for the contact information associated with a selected contact. Upon finding a piece of contact information owned by a selected contact, the routine 21 checks the visibility attribute of that piece of contact information. If the visibility attribute is set to global, the routine 22 displays the contact information in the appropriate place in the contact information view. If the visibility attribute is not set to global, the routine 21 checks to see if the folder through which the piece of contact information is being accessed is listed within the set of folders specified by the visibility attribute for the piece of contact information as having access to the piece of contact information. If so, the routine 22 displays the piece of contact information in the appropriate location on the contact information view of the display screen. However, if the folder through which access is occurring is not listed in the visibility attribute as one of the folders having access to this piece of contact information, then the routine 22 does not display the piece of contact information and the routine 21 continues searching for other pieces of contact information for the selected contact.

FIGS. 12–14 illustrate contact information tables for different types of contact address and phone number information. The tables of FIGS. 12–14 store various attributes for each type of contact information, are stored within the database 16 and may be used to provide limited access to pieces of contact information. FIG. 12 illustrates an address table 120 having the unique IDs or keys of ADDRESS_ID and ADDRESS_SCR_ID which may be used to provide a unique ID for each address stored in the address table 120. Each address entry includes a number of attributes including an OWN_LIST_ID and an OWN_LIST_SCR_ID which define the contact owning the piece of address information, and an ADDR_TYP_ID which defines an address type. Each address may include attributes used to store the specifics of the address, such as LINE1, LINE2 and LINE3 attributes for street or postal information, and CITY, STATE, POSTAL_CD and COUNTRY attributes for city, state, zip code and country designations. Still further, each address includes an OWN_DIR_ID attribute and an OWN_DIR_SCR_ID attribute which define the one or more folders through which the particular piece of address information is visible. If the OWN_DIR_ID attribute and the OWN_DIR_SCR_ID attribute are set to, for example, zero or some other predetermined number, then the address information is globally visible. Otherwise, these attributes provide the ID or IDs for the folders through which the particular piece of address information is visible. Of course, other attributes, such as auditing attributes and attributes used for other purposes within the relationship management system can also be provided and will not be discussed further herein.

Similarly, FIG. 13 illustrates an electronic address contact information table 130 including unique IDs or keys of ELEC_ADDR_ID and ELEC_ADDR_SCR_ID which may be used to provide a unique ID for each electronic address stored in the electronic address table 130. Each electronic address entry includes a number of attributes including an ELEC_ADDR_TYP_ID attribute which defines an electronic address type, such as an e-mail or a web site address, and OWN_LIST_ID and OWN_LIST_SCR_ID attributes which define the contact owning the piece of electronic address information. Each electronic address may include attributes used to store the specifics of the electronic address, such as LABEL which stores a label to be displayed for the electronic address and ELEC_ADDR which stores the electronic address. Still further, each electronic address includes an OWN_DIR_ID attribute and an OWN_DIR_SCR_ID attribute which define the one or more folders through which the electronic address information is visible. If these attributes are set to, for example, zero or some other predetermined number, then the electronic address information is globally visible. Otherwise, these attributes provide the ID or IDs for the folders through which the address information is visible.

Likewise, FIG. 14 illustrates a phone number coritact information table 140 including unique IDs or keys of PHONE_ID and PHONE_SCR_ID which may be used to provide a unique ID for each phone number stored in the phone number table 140. Each phone number entry includes a number of attributes including a PHONE_TYP_ID attribute which defines a type of phone number, such as a regular phone, a facsimile, a cellular phone, etc., and OWN_LIST_ID and OWN_LIST_SCR_ID attributes which define the contact owning the piece of phone number information. Each phone number may include attributes used to store the specifics of the phone number, such as LABEL which stores a label to be displayed for the phone number and PHONE_NUM which stores the actual phone number. Still further, each phone number includes an OWN_DIR_ID attribute and an OWN_DIR_SCR_ID attribute which define the one or more folders through which the phone number information is visible. If these attributes are set to, for example, zero or some other predetermined number, then the phone number information is globally visible. Otherwise, these attributes provide the ID or IDs for the folders through which the phone number information is visible.

Of course, similar tables could be created for other types of contact information and these tables could include a visibility attribute that defines the folders or users through which the specific pieces of contact information are visible. It will be understood that the organization of and the names, data types, etc. of the variables and attributes used within the tables illustrated in FIGS. 6, 7 and 12–14 can be changed as desired or needed without departing from the scope of the invention. Likewise, while the tables illustrated in FIGS. 6, 7 and 12–14 use two attributes to define each folder, contact, user and piece of contact information, only one such identifier is needed. It will also be understood that the routine 20, when displaying private information, i.e., information that is not globally visible, may display a lock icon or other icon next to the information, as illustrated in FIG. 2 for the direct business phone number for Jane Tarnoff and as illustrated in FIG. 11 for the home phone number for Jane Tarnoff.

Each contact information record (i.e. piece of contact information) may further include an attribute (referred to herein as a reason attribute) representative of the reason for a folder specific restriction being placed upon that contact information record. The most common reason for a restriction is that the information is confidential and should only be viewed by those folders which are specified to have access to the confidential information. Another reason for a restriction may be that the information is temporary and is only required for a limited time. For example, a contact may be temporarily located in a hotel in New York on business, and the contact's temporary hotel address should be available only to those folders which need to know the contact's temporary New York location.

Another example of a reason for a folder specific restriction being placed upon a contact information record is when the system performs a merge operation between contacts that are the same entity and the system detects inconsistent contact information. Periodically, the system may perform a merge upon all contact information records to ensure accuracy of the data. If a user's "version" of contact information being merged contains different information than the "version" it is being merged into, the system may preserve the user's "version" by making it private to the user's folder. In this case, the attribute representative of the reason for a folder specific restriction being placed upon that contact information record would indicate the restriction is system generated as the result of a failed merge. Of course, other reasons for making a contact information record visible in less than all of the folders exist and could be indicated by the reason attribute. Also it will be understood that the reason attribute may take on any defined data structure such as numerical, ASCII, etc. and may be stored in contact information record tables, such as those of FIGS. 12–14, in any desired manner.

The system 10, and specifically the display routine 22, has the ability to visually represent the reason for any specific restriction by way of, for example, icons. Thereby, as discussed above, the routine 22 may display a lock icon when the contact information is not visible to all folders because it is specifically marked as private by a user. When the reason attribute indicating the reason for the folder restriction is that the piece of information is temporary, the routine 22 may display a 'T' icon, visually indicating the temporary contact information is not visible to all folders. The routine 22 may similarly display a question-mark icon, to indicate the folder restriction was due to a failed system merge. Of course, other reasons for restrictions, or even lack of restrictions may be stored within the reason attribute for each contact information record, and similarly, other icons may be used to represent those reasons.

Although the routine 20, including the user-contact reference routine and the visibility checking routine described herein are preferably implemented in software stored in, for example, a memory of a user workstation or user interface, these routines may alternatively or additionally be implemented in hardware, firmware, etc., as desired. If implemented in software, the routines may be stored in any computer readable memory such as on a magnetic disk, a laser disk, an optical disk or other storage medium, in a RAM or ROM of a computer, user interface, workstation or other processing device. Likewise, this software may be delivered to a user or to a processing device via any known or desired delivery method including, for example, over a communication channel such as a telephone line, the Internet, etc.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A relationship management system adapted to be used with a processor, a database and a display device, comprising:

a computer readable medium;

a database routine stored on the computer readable medium and adapted to store, within the database, one or more contact information records for each of a plurality of contacts, wherein the one or more contact information records are capable of being referenced by one or more folders and wherein each of the contact information records has a contact information record type, the database routine further adapted to store a visibility attribute for each of the contact information records to define the folders through which the associated contact information record is viewable, and wherein the database routine is further adapted to allow a user having appropriate access rights to a particular one of the folders to specify the visibility attribute for at least one of the contact information records viewable through the particular one of the folders, and wherein the user and the contact having the contact information records are different entities; and a display routine stored on the computer readable medium and adapted to be executed on the processor to display, on the display device, a contact information field within one of the folders, the contact information field displaying each of the contact information records of a particular contact information type that is defined as being viewable through the one of the folders by the visibility attribute of that contact information record.

2. The relationship management system of claim 1, wherein the one or more contact information records include post office address information.

3. The relationship management system of claim 2, wherein the database routine is adapted to store the one or more contact information records in a contact post office address information table within the database.

4. The relationship management system of claim 2, wherein the display routine is adapted to display, within the one of the folders, a contact post office address information field.

5. The relationship management system of claim 1, wherein the one or more contact information records include electronic address information.

6. The relationship management system of claim 5, wherein the one or more contact information records include email address information.

7. The relationship management system of claim 5, wherein the one or more contact information records include web site address information.

8. The relationship management system of claim 5, wherein the database routine is adapted to store the one or more contact information records in a contact electronic address information table.

9. The relationship management system of claim 5, wherein the display routine is adapted to display, within the one of the folders, a contact electronic address information field.

10. The relationship management system of claim 1, wherein the one or more contact information records include telephone number information.

11. The relationship management system of claim 10, wherein the database routine is adapted to store the one or more contact information records in a contact telephone number information table.

12. The relationship management system of claim 10, wherein the display routine is adapted to display, within the one of the folders, a contact telephone number information field.

13. The relationship management system of claim 1, wherein the visibility attribute for a particular contact information record defines the particular contact information record to be viewable through all of the folders.

14. The relationship management system of claim 1, wherein the visibility attribute for a particular contact information record defines the particular contact information record to be viewable through less than all of the folders.

15. The relationship management system of claim 14, wherein the database routine is adapted to store a reason attribute for the particular contact information record defining the reason why the particular contact information record is viewable through less than all of the folders.

16. The relationship management system of claim 15, wherein the display routine is further adapted to display, in the contact information field, an icon representing the value of the reason attribute of the particular contact information record.

17. The relationship management system of claim 16, wherein the icon is a 'T' icon.

18. The relationship management system of claim 16, wherein the icon is a question-mark icon.

19. The relationship management system of claim 16, wherein the icon is a lock icon.

20. The relationship management system of claim 1, wherein the visibility attribute for a particular contact information record defines the particular contact information record to be viewable through one and only one of the folders.

21. The relationship management system of claim 1, wherein the display routine is further adapted to display, in the contact information field, an icon representing a type of the visibility attribute of one of the contact information records.

22. The relationship management system of claim 1, wherein the database routine is adapted to query a user to determine if a particular contact information record is to be viewable through all of the folders, or through less than all of the folders.

23. The relationship management system of claim 1, wherein the computer readable medium is an optical storage medium.

24. The relationship management system of claim 1, wherein the computer readable medium is a magnetic storage medium.

25. The relationship management system of claim 1, wherein the computer readable medium is a random access memory.

26. A relationship management system, comprising:
a processor;
a display device coupled to the processor;
a database that stores a plurality of contact information records for each of a multiplicity of contacts, wherein each of the plurality of contact information records has a contact information record type and wherein the plurality of contact information records are capable of being referenced by a number of folders, the database further storing a visibility attribute in each of the plurality contact information records indicating the ones of the folders through which the associated contact information record is viewable, and wherein the database is adapted to allow a user to specify the visibility attribute for at least one of the plurality of contact information records for a particular one of the multiplicity of contacts, wherein the user and the particular one of the multiplicity of contacts are different entities; and
a display routine adapted to be executed on the processor to display, on the display device, a contact information display field within one of the folders, the contact information display field displaying each of the plurality of contact information records of a particular contact information record type that is defined as being viewable through the one of the folders by the visibility attribute of that contact information record.

27. The relationship management system of claim 26, wherein the plurality of contact information records include post office address information.

28. The relationship management system of claim 26, wherein the plurality of contact information records include electronic address information.

29. The relationship management system of claim 26, wherein the plurality of contact information records include telephone number information.

30. The relationship management system of claim 26, wherein the visibility attribute for a particular one of a plurality of contact information records defines the particular one of a plurality of contact information records to be viewable through all of the folders.

31. The relationship management system of claim 26, wherein the visibility attribute for a particular one of a plurality of contact information records defines the particular one of a plurality of contact information records to be viewable through less than all of the folders.

32. The relationship management system of claim 26, wherein the visibility attribute for a particular one of a plurality of contact information records defines the particular one of a plurality of contact information records to be viewable through one and only one of the folders.

33. The relationship management system of claim 26, wherein the display routine is further adapted to display, in the contact information display field, an icon representing a type of the visibility attribute of a particular one of the plurality of contact information records.

34. The relationship management system of claim 26, wherein the database routine is adapted to query a user to determine if a particular one of the plurality of contact information record is to be viewable through all of the folders, or through less than all of the folders.

35. A method of storing and displaying contact information viewable by one or more folders, the method comprising the steps of:
storing a plurality of contact information records for each of a multiplicity of contacts in a database, wherein each of the plurality of contact information records has a contact information record type;
storing a visibility attribute for each of the plurality of contact information records wherein each visibility attribute defines the one or more of the folders through which an associated contact information record is viewable;
associating a user with at least one of the contact information records for a particular one of the contacts, and allowing the user to specify the visibility attribute for each of the contact information records with which the user is associated, wherein the user and the particular one of the contacts are different entities; and
displaying a contact information field within one of the folders, wherein the contact information field displays each of the contact information records of a particular contact information record type defined to be viewable through the one of the folders by the visibility attributes.

36. The method of claim 35, including the step of storing post office address information within the plurality of contact information records.

37. The method of claim 35, including the step of storing electronic address information within the plurality of contact information records.

38. The method of claim 35, including the step of storing telephone number information within the plurality of contact information records.

39. The method of claim 35, including the step of using the visibility attribute for a particular one of a plurality of contact information records to define the particular one of a plurality of contact information records to be viewable through all of the folders.

40. The method of claim 35, including the step of using the visibility attribute for a particular one of a plurality of contact information records to define the particular one of a plurality of contact information records to be viewable through less than all of the folders.

41. The method of claim 40, including the step of storing a reason attribute for the particular one of a plurality of contact information records defining the reason why the particular one of a plurality of contact information records is viewable through less than all of the folders.

42. The method of claim 41, further including the step of displaying, in the contact information field, an icon representing the value of the reason attribute of the particular one of a plurality of contact information records.

43. The method of claim 42, wherein the step of displaying an icon further includes the step of displaying a 'T' icon.

44. The method of claim 42, wherein the step of displaying an icon further includes the step of displaying a question-mark icon.

45. The method of claim 42, wherein the step of displaying an icon further includes the step of displaying a lock icon.

46. The method of claim 35, including the step of using the visibility attribute for a particular one of a plurality of contact information records to define the particular one of a plurality of contact information records to be viewable through one and only one of the folders.

47. The method of claim 35, further comprising the step of displaying, in the contact information field, an icon representing the type of the visibility attribute of a particular one of the one or more contact information records.

48. The method of claim 35, further comprising the step of querying a user to determine if a particular one of the one or more contact information records is to be viewable through all of the folders, or through less than all of the folders.

* * * * *